July 24, 1956 H. M. BRANDAU ET AL 2,756,097
PROCESS FOR WEATHER CONTROL
Filed Sept. 12, 1951 2 Sheets-Sheet 1
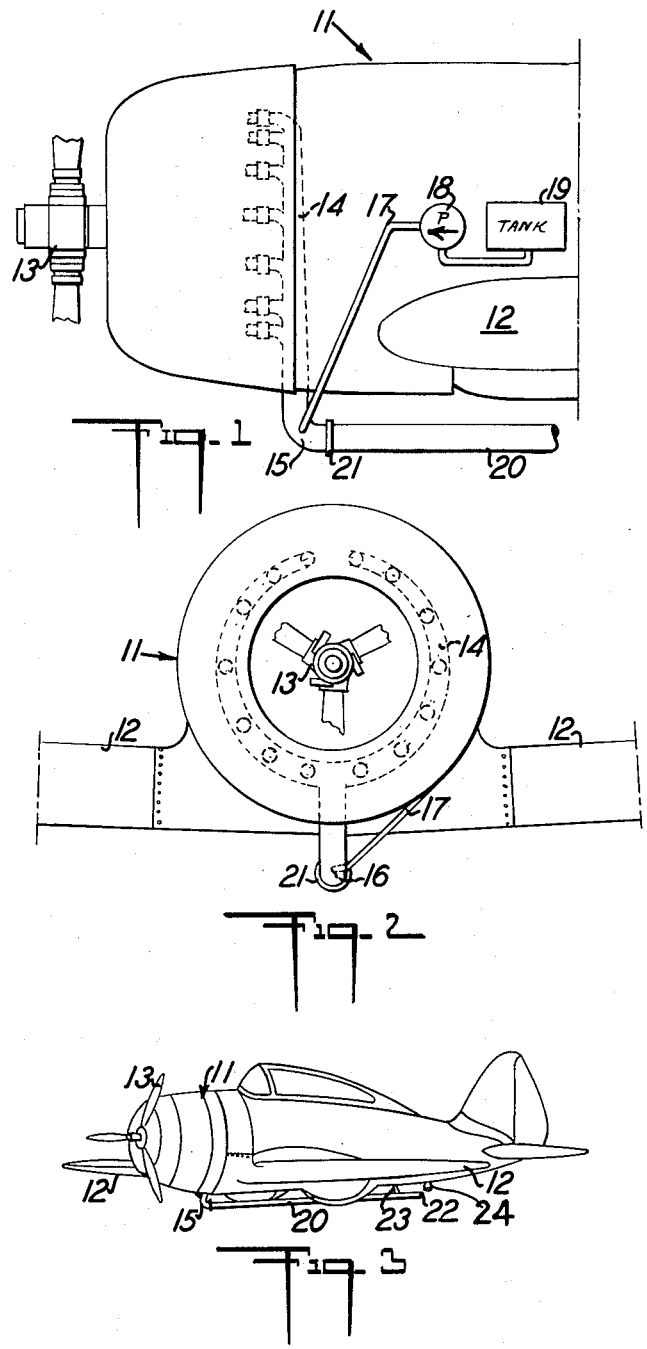
INVENTOR.
HARVEY M. BRANDAU
EUGENE K. KOOSER
BY
Fisher + Christen,
ATTORNEYS

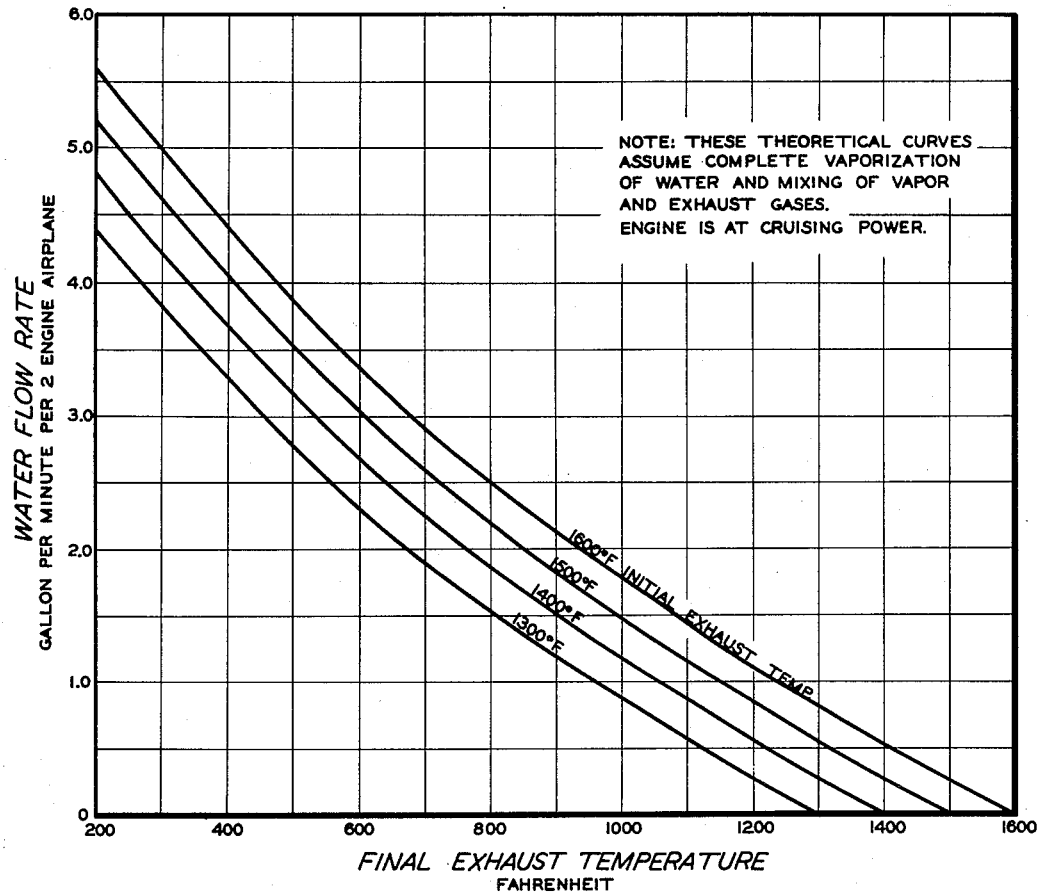

2,756,097

PROCESS FOR WEATHER CONTROL

Harvey M. Brandau and Eugene K. Kooser,
Medford, Oreg.

Application September 12, 1951, Serial No. 246,319

7 Claims. (Cl. 299—28)

This invention relates generally to a process for controlling weather conditions, and more specifically, to a process for dissipating clouds and fog by clearing the atmosphere of moisture particles that are small enough to remain in suspension in the atmosphere and yet large enough to be visible.

Specifically, it is an object of this invention to maintain favorable weather conditions at airports and air traffic zones by reducing economically the amount of visible water vapor forming fog and clouds.

Another object of this invention is to control weather which causes hail damage by modifying hail-producing clouds over the areas to be protected.

Another object of this invention is to control weather which causes lightning and electrical disturbances which interfere with radio transmission.

A further object of the present invention is to provide rain in designated areas.

It is another object of our invention to effect dissipation of warm clouds.

Another object of our invention is to produce ice nuclei in clouds above the freezing level.

Further objects of the present invention will be apparent from the description of the invention.

The invention generally comprises altering weather conditions in the unconfined, non-vacuous atmosphere by injecting water into the hot exhaust gases of a power plant to produce dry water vapor and dispersing the mixture of dry water vapor and hot exhaust gases into the atmosphere.

A further embodiment comprises injecting water into exhaust gases of a power plant having a temperature above 1000° F. and dispersing the mixture of exhaust gases and dry water vapor into the atmosphere.

Other embodiments comprise injecting water solutions of ionic salts, such as sodium chloride, sodium carbonate, sodium bicarbonate, potassium chloride, potassium iodide and the like into hot exhaust gases of a power plant and dispersing the mixture of exhaust gases, water vapor and ionic salt into the atmosphere.

Other modifications include injecting water or water solutions of ionic salts into the exhaust of a power plant wherein the power plant is an aircraft internal combustion engine, jet engine and the like.

The invention also comprises exposing the mixture of exhaust gases, water vapor and ionic salt to ultra-violet light or other actinic radiation.

It is known that a stable suspension of water particles in air, such as fog or clouds, represents an equilibrium of thermodynamic and electrical forces. An explanation of the phenomenon of atmospheric conditions including fog and clouds and the thermodynamics thereof is given in United States Patent 2,550,324 to Brandau, issued April 24, 1951. The process of the present invention is directed to destroying this physical equilibrium and effecting the dissipation and other changes of the clouds and fog. It is known, for example, to upset the balance in a cloud formation by condensing the water therefrom by means of hygroscopic particles. Particles providing a nucleus for the condensation of water, such as silver iodide, have also been used to produce ice crystals, snow and rain. It is also known to dissipate clouds by upsetting the electrical balance therein with particles charged with static electricity. Other known methods of dissipating clouds include upsetting the thermal balance thereof by dispersing Dry Ice, flake ice, and the like therein.

We have discovered that quantities of very dry superheated water vapor will disturb the thermal and electrical balances of cloud formations, causing dissipation or precipitation. We have further discovered that if ionic salts are present in the superheated water vapor, the process of effecting dissipation is more effective. Additionally, we have discovered that irradiation of the water vapor containing ionic salts with ultra-violet light or other actinic rays further increases the effectiveness of the dissipating process. We accomplish the process of our invention by injecting water or water solutions of ionic salts into the heated exhaust gases of a power plant, such as an internal combustion engine, jet engine and the like. The power plant may be the engine of an airplane.

While it is not intended that the invention be bound by any particular theory of operation, successful experiments using the process of the present invention indicate that the dispersion of superheated water vapor dissipates certain types of clouds by disturbing the electrical balance thereof. This is evidenced by the fact that ionic salts in combination with the superheated water vapor are more effective in dissipating these clouds. The phenomenon of electrolytic dissociation of ionic salts in water solutions is well known. It is believed that subjecting water solutions of ionic salts to the high temperature of the exhaust gases causes dissociation of the salt into its charged ions. These charged ions in turn upset the electrical balance in cloud formation and cause dissipation or precipitation in accordance with its use. According to one theory, each suspended water particle carries an electrical charge on its surface. The phenomenon of like charges repelling and unlike charges attracting is well known. The presence of charged ions effects neutralization or disturbance of the electrical charges on the water particles, which in turn causes dissipation or coalescence, depending on the degree of saturation of the atmosphere.

Evidence of this electrical effect includes the fact that the dispersion of superheated water vapor containing sodium chloride, for example, in a cumulonimbus cloud accelerates lightning discharges therein. The dispersion of ionic particles causes modification of the cloud at an early period in its life, resulting in gentle rain, rather than violent hail and electrical storms. The effect of the charged ion particles may likewise account for the fact that the western coastline of the United States receives very few hail storms because suspended salt picked up from the Pacific Ocean by the prevailing westerly winds causes precipitation in the cumulonimbus clouds before they get to the hail-producing stage.

The electrical nature of the process for weather control is further evidenced by experiments using potassium salts in aqueous solution and injecting such solution into the hot exhaust gases of an aircraft engine. Thus, a sodium chloride solution containing a small amount of potassium iodide is more effective in dissipating clouds than solutions containing sodium chloride alone. This effect may be explained by the fact that potassium exhibits the property of photoelectric emission. The sunlight acting on the potassium ions further activates them and increases the electrical disturbance within the cloud.

The dissipation takes place more rapidly on the side of the cloud exposed to the sun's rays. Exposing the mixture of heated exhaust gases, water vapor and ionic salt to ultra-violet or other actinic radiation also increases the speed of the dissipating process. The latter phenomenon may be explained by the fact that actinic radiation is known to activate ions.

Further evidences of the electrical nature of the process for effecting weather control by means of forming superheated water vapor containing an ionic salt is found in the effect on electrical apparatus. Thus, aircraft radio communication within the aircraft dispensing a solution of an ionic salt is rendered completely inoperative by static when dispensing a solution of sodium chloride into the exhaust manifold of the aircraft engine.

In the drawings, showing one form of apparatus suitable for the practice of our invention, Fig. 1 is a schematic side view of the front end of an airplane;

Fig. 2 is a schematic front view of the section of the airplane shown in Fig. 1;

Fig. 3 is a perspective view of an airplane; and

Fig. 4 is a graphical representation of the effect of water injection on the temperature of exhaust gases of an internal combustion engine.

A conventional aircraft is shown in which the fuselage is indicated generally at 11, having wings 12 and propeller 13. The collector ring of a radial aircraft engine is shown in dotted lines at 14. The collector ring terminates in a tail pipe 15. A nozzle 16 is fitted into tailpipe 15, the nozzle being connected by tube 17 to a pump, indicated schematically at 18. Tank 19 contains the solution to be injected into tailpipe 15. An extension pipe 20 is connected to tailpipe 15 by suitable flanges indicated generally at 21. The open end 22 of the tailpipe extension is suitably attached to the aircraft fuselage, as at 23.

Preferably, the tailpipe extension 20 is a 5-inch diameter stainless steel pipe about 6 to 8 feet long. It is also desirable to cover the pipe 20 with insulating material, preferably asbestos.

The nozzle 16 may be of any convenient construction. We have found that a pitot tube nozzle or a nozzle for agricultural sprayers is satisfactory. The nozzle 16 is shown in Figure 1 mounted in the tailpipe 15, but it may be mounted in the collector ring 14 or adjacent the engine cylinders. It is desirable to inject the solution into the exhaust gases at a point where the gases are at a maximum temperature.

The pump 18 is a high pressure pump. We have found an electrically driven pump producing up to 600 pounds per square inch satisfactory. The tank 19 is of any convenient capacity.

An ultra-violet lamp 24 is positioned so as to irradiate the gases emerging from the end 22 of the tailpipe extension 20.

The water or water solution is very rapidly evaporated by the heated exhaust gases, producing a very dry superheated vapor. Ttemperatures of the exhaust gas-water vapor mixture are given in Fig. 4, calculated from the exhaust temperatures of an R–1830 engine in common use on DC–3 aircraft. The exhaust temperature at the end of the tailpipe shown at 21 in Fig. 1 is 1500° F. at cruising speed. The temperature decreases as the gases move through the tailpipe extension 20. The curves in Fig. 4 show the variation in final temperature of the exhaust gas-water vapor mixture with the amount of water injected.

The curves in Fig. 4 were calculated as follows:

When a given amount of water is sprayed into the exhaust gases in an extended exhaust stack, the heat from the gases heats the water to the boiling temperature, converts the liquid water to a vapor or gas at the same temperature and then raises the vapor from the boiling temperature to the exhaust gas temperature existing at that time. This exhaust gas temperature will be lower than it was before it contacted the water since the heat required to raise the water temperature has been extracted from the exhaust gases. As more water is added, the final mixture temperature of the exhaust gases plus water vapor will be reduced. After adding a given quantity of water to the exhaust gases the final mixture temperature will be such that the heat dissipated by the exhaust in dropping to that temperature will equal the heat added to the water to raise it to that temperature. To establish the curves on the attached sheet the above values were equated, varying the initial and final exhaust temperatures and solving for the water flow in each case. A sample calculation for one point is as follows:

For an initial gas temperature of 1500° F. and a final mixture temperature of 1000° F., X is the quantity of water required.

$$\frac{73.3\text{ lbs. air}}{\text{min.}}\times(1500-1000)^\circ\text{ F.}\times\frac{.256\text{ B.t.u.}}{\text{lb. air}}\times 1^\circ\text{ F.}=\frac{X\text{ lb. water}}{\text{min.}}\times\left[144^\circ\text{ F.}\times\frac{1\text{ B.t.u.}}{\text{lb. water}}\times 1^\circ\text{ F.}+\frac{981\text{ B.t.u.}}{\text{lb. water}}+\left(\frac{(1000-194)^\circ\text{ F.}\times .51\text{ B.t.u.}}{\text{lb. water vapor}}\times 1^\circ\text{ F.}\right)\right]$$

$$9390\frac{\text{B.t.u.}}{\text{min.}}=1536\times\frac{\text{B.t.u.}}{\text{min.}}$$

$X=6.01$ lb. water per minute per engine or 12.02 lb. water per minute per airplane 12.02 lb. water=1.46 gallons of water per minute per airplane In the above equation, 73.3 lb. air per minute is the amount of air passing through the engine and out the exhaust at a cruising power of 630 B. H. P. The specific heat of air at exhaust temperatures is 0.256 B. t. u./lb. air/° F. To be extremely accurate, the specific heats of the components of the exhaust gas should be used, but this is impractical since their ratio will vary with the carburetor mixture setting. The average specific heat of these components will vary within only a few percent of the specific heat of air so the latter was assumed for the purpose of calculation. The specific heat of water and water vapor and the heat of vaporization are standard values.

It was arbitrarily assumed that the water was 50° F. before spraying and that the spraying was done at 10,000 feet, where it boils at 194° F. A lower altitude operation would have a negligible effect on the answer.

We have found that the final temperature should not be below about 500° F. for dissipation of clouds. Temperatures of about 1000° F., however, have been found more effective in dissipating clouds. Hence, for this engine, about 6 lbs. of water per minute per engine is injected into exhaust gases at 1500° F. to give a final temperature of about 1000° F.

We have found that water alone is quite satisfactory in dissipating certain clouds and fog. The effectiveness is increased by the addition of various ionic salts. The following examples illustrate the process of our invention:

*Example 1*

An airplane equipped with a 450 horsepower Pratt & Whitney 9-cylinder radial engine having a displacement of 985 cubic inches was fitted with an 8-foot tailpipe extension of 5-inch stainless steel. The tailpipe extension was wrapped with three layers of asbestos fabric. A small spray nozzle was inserted into a hole in the tailpipe adjacent the exhaust collector ring of the engine and connected by means of a copper tube to a pump developing up to 600 p. s. i. The pump was in turn connected by means of a copper tube to a 55 gallon drum.

When the aircraft was in flight at full throttle, the gasoline consumption was 30 to 35 gallons per hour. The collector ring was cherry red from the heat of the exhaust gases. Stack temperatures for this engine range from about 3500° F. at the point where the exhaust valve empties into the collector ring, to about 1500° F. at the stack outlet when no extension pipe is provided.

Three passes through the top level of a cloud bank about 1000 feet thick were made while injecting water at the rate of about one-half pint per minute. The cloud bank was about 2500 feet at the base, with a cloud top at about 3500 feet. Three paths were cut through the cloud bank which in about twenty minutes dissipated a considerable area of the cloud bank. No rain was observed.

*Example 2*

The airplane equipped as in Example 1 was flown through the top of a cloud having a base of about 2500 feet and a top of 4000 feet. A 20% by weight aqueous solution of sodium chloride was injected at the rate of about one pint per minute. One pass opened up a wide path in the cloud and the entire cloud soon dissipated. No rain was observed to fall.

*Example 3*

The airplane equipped as in Example 1 was flow through a cloud bank having a base of about 1500 feet and a cloud top of about 3500 feet. A 15% by weight aqueous solution of sodium chloride containing 2 ounces potassium iodide per 55 gallon solution was injected at the rate of about 1½ pints per minute. A single pass through the sunlit top opened up a wide area in the cloud bank. A second pass near the bottom level opened up a narrower area.

*Example 4*

The airplane equipped as in Example 1 and including an ultra-violet lamp mounted at 24 in Fig. 3, positioned to irradiate the gases coming from the end 22 of the tailpipe was flown through the top portion of a cloud bank extending from 1000 feet to 2500 feet. A single pass through the cloud bank while injecting a 20% by weight aqueous solution of sodium carbonate at the rate of 2 pints per minute while irradiating the escaping mixture cleared a path through the clouds. The path widened to about 300 yards after about 15 minutes.

*Example 5*

A 6-foot length of 4-inch stainless steel pipe was attached to each tailpipe of a Twin Cessna T-50 aircraft equipped with two Jacobs radial engines. The tailpipe extensions were mounted concentrically within 5-inch pipes with dead airspace between the two pipes. A nozzle was inserted into each tailpipe adjacent the exhaust manifolds of the engines and connected by copper tubing to a 55-gallon drum through an electrically driven pump delivering 600 p. s. i.

Gasoline consumption is about 30 to 35 gallons per hour at full throttle for this aircraft. Exhaust stack temperatures range from about 3500° F. at the point where the exhaust valve empties into the exhaust manifold down to about 1500° F. at the tailpipe outlet without the tailpipe extension.

The aircraft thus equipped was flown through the freezing level of a cumulonimbus cloud having a base at about 2000 feet and extending up to about 8000 feet. The freezing level was about 5000 feet. An aqueous solution containing 15% sodium carbonate by weight and 5% sodium bicarbonate by weight was injected at the rate of about one pint per minute. After three passes through the cloud at about 5000 feet, the cloud anvilled out on top. The anvil top was composed of ice crystals and precipitation occurred. After about ten minutes the precipitation had ceased and the cloud had pancaked down to about 2000 feet thick and in another 20 minutes had completely dissipated.

*Example 6*

The Twin Cessna equipped as in Example 5 was flown through the top portion of a low-lying cloud bank having a base at about 800 feet and extending up to about 2000 feet. A solution of potassium chloride in water containing about 20% potassium chloride by weight was injected at the rate of about one-half pint per minute. A single pass through the bank opened up a path which widened to about 400 yards after about 15 minutes. No rain was observed.

From the above examples, it is seen that the process of our invention affords an economical means for dissipating clouds. It finds further use in modifying hail-producing cumulonimbus clouds.

In the above examples, the water or water solution was injected at the rate of about one-half pint to 2 pints per minute. This is the optimum rate for engines having a fuel consumption of about 30 to 35 gallons of gasoline per hour. If the injection rate is increased, the water is not superheated and appears as wet steam in the exhaust gases. This wet steam is much less effective in dissipating clouds than the dry superheated vapors produced in the examples above. For engines having a greater fuel consumption, a higher rate of injection may be used if necessary for optimum cloud dissipation. Thus, for the R-1830 engine, curves for which are given in Fig. 4, up to six pounds (about six pints) of water per minute can be injected to give a final temperature of about 1000° F.

Our invention is to be distinguished from the method of seeding clouds embodying the dispersion of silver iodide nuclei. It is also to be distinguished from the method of producing such nuclei by the method disclosed in U. S. Patent 2,527,231, issued October 24, 1950, comprising injecting solutions of silver iodide into a flame. Thus, if a solution of silver iodide is injected into the exhaust stack of an aircraft engine adjacent the exhaust manifold and provided with a tailpipe extension, as described herein, the silver iodide deposits on the inside of the tailpipe extension and very few of the nuclei escape to the atmosphere. The silver iodide solution must be injected into a flame immediately adjacent the surrounding atmosphere, as at a position indicated at 22 in Fig. 3 of the drawings.

Contrasted with this necessity for dispersing silver iodide solution immediately adjacent the surrounding atmosphere, the long tailpipe extension 20 greatly increases the effectiveness of our process. The tailpipe increases the time of contact of the hot exhaust gases and the vapor produced. Injection of a sodium chloride solution into the tailpipe of an aircraft engine not equipped with a tailpipe extension is much less effective in dissipating clouds than when employing a 6 to 8-foot tailpipe extension.

It is contemplated that other types of engines may be used in the process of our invention. Thus, jet engines or turbo-jet engines may be equipped to inject solutions into the hot exhaust gases. Also within the scope of this invention is the method of dissipating clouds and fog by injecting solutions into the exhaust from vertically mounted portable jet engines, the thrust of the exhaust gases carrying the superheated vapor and ions high into the atmosphere. Other embodiments and modifications will be apparent to those skilled in the art.

While the invention has been described in particular embodiments and examples, it is intended to cover such other modifications and embodiments within the spirit and scope of the appended claims.

We claim as our invention:

1. A process for disturbing the stability and modifying the structure of clouds in the unconfined non-vacuous atmosphere which comprises injecting water into the hot exhaust gases in the exhaust manifold of an internal combustion engine, said exhaust gases having a temperature from about 1000° to 3500° F., said water being injected in an amount sufficient to produce dry water vapor and less than that required to produce wet steam, said amount of water comprising from ⅛ to ½ the volume of fuel burned in said engine, and dispersing said combined water vapor and hot exhaust gases in the cloud.

2. A process for disturbing the stability and modifying the structure of clouds in the unconfined non-vacuous atmosphere which comprises injecting an aqueous solution of an ionic salt into the hot exhaust gases in the exhaust manifold of an internal combustion engine, said exhaust gases having a temperature from about 1000° to 3500° F., said aqueous solution being injected in an amount sufficient to produce dry water vapor and less than that required to produce wet steam, and dispersing said combined water vapor, ionic salt and hot exhaust gases in the cloud.

3. The process set forth in claim 2 wherein the ionic salt selected from the group consists of sodium and potassium salts.

4. The process set forth in claim 2 wherein the ionic salt comprises a sodium salt.

5. The process set forth in claim 2 wherein the ionic salt comprises sodium chloride.

6. The process set forth in claim 2 wherein said ionic salt comprises a mixture of sodium chloride and potassium iodide.

7. The process set forth in claim 2 wherein the combined dry water vapor, ionic salt and hot exhaust gases are irradiated with actinic radiation while being dispersed in said cloud.

References Cited in the file of this patent

UNITED STATES PATENTS

| | | |
|---|---|---|
| 1,426,338 | Sperry | Aug. 15, 1922 |
| 1,501,818 | Soulek et al. | July 15, 1924 |
| 2,052,626 | Houghton | Sept. 1, 1936 |
| 2,232,728 | Pleasants | Feb. 25, 1941 |
| 2,564,555 | Anderson | Aug. 14, 1951 |
| 2,565,720 | Collison et al. | Aug. 28, 1951 |